Figure 3:
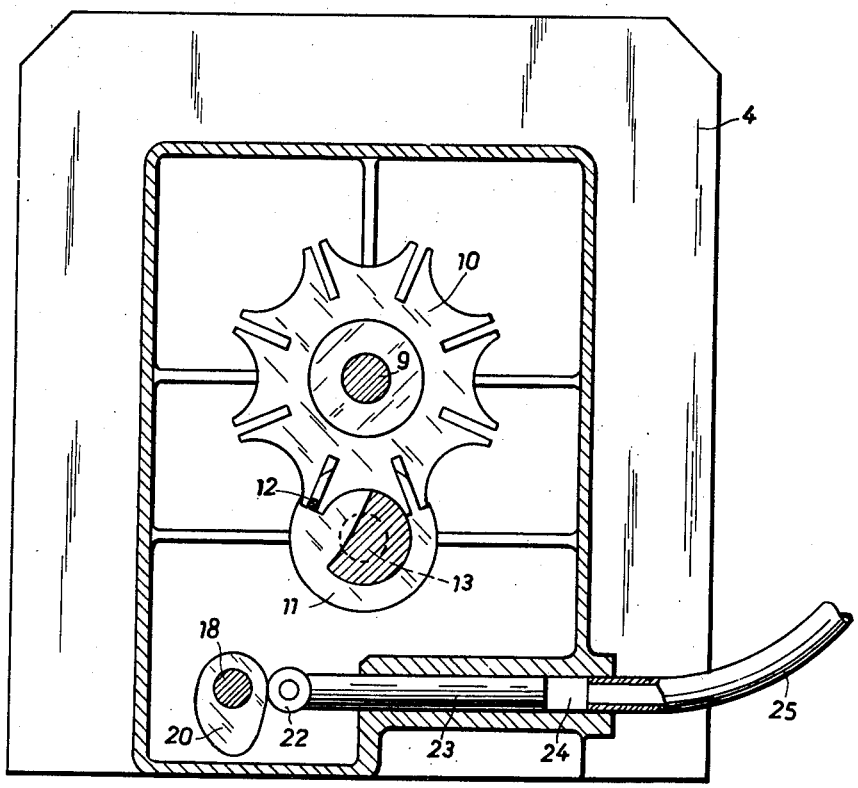

March 31, 1964
W. HÄBERLE
3,126,583
APPARATUS FOR THE MANUFACTURE OF CONTAINERS OBTAINED BY DEEP DRAWING FROM A THERMOPLASTIC SYNTHETIC SHEETING
Filed Jan. 30, 1961
2 Sheets-Sheet 1
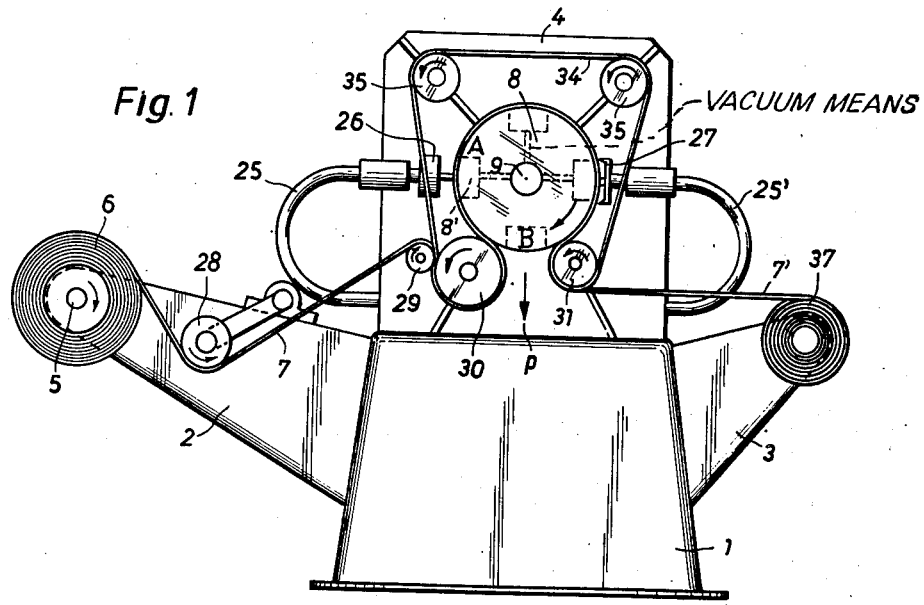
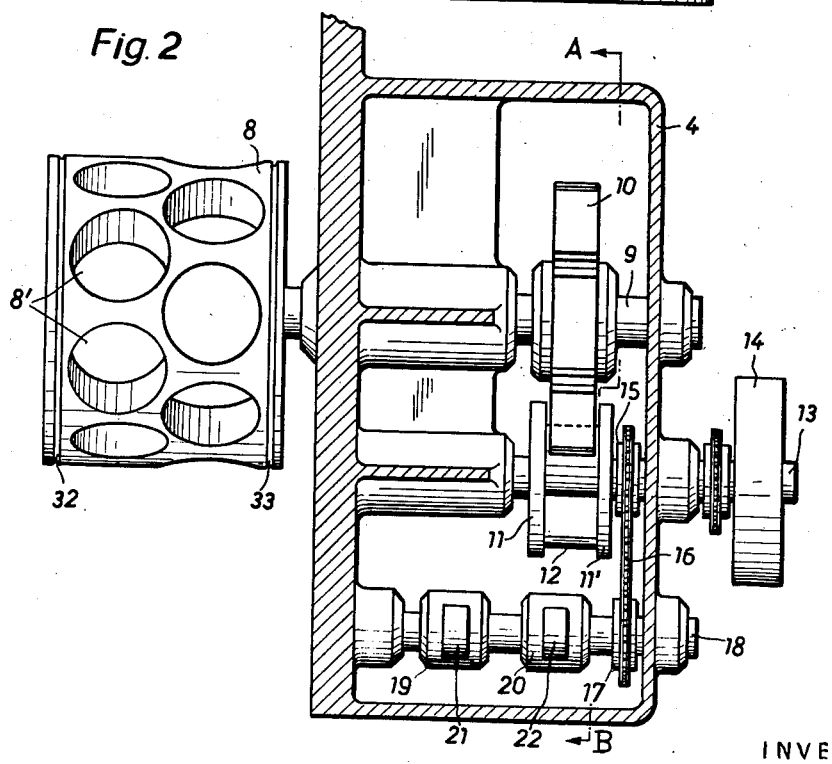
INVENTOR
WILLI HÄBERLE
ATTORNEYS March 31, 1964

W. HÄBERLE 3,126,583

APPARATUS FOR THE MANUFACTURE OF CONTAINERS OBTAINED BY DEEP DRAWING FROM A THERMOPLASTIC SYNTHETIC SHEETING

Filed Jan. 30, 1961

2 Sheets-Sheet 2

INVENTOR
WILLI HÄBERLE
BY Wenderoth, Lind & Ponack
ATTORNEYS

United States Patent Office 3,126,583
Patented Mar. 31, 1964

3,126,583
APPARATUS FOR THE MANUFACTURE OF CONTAINERS OBTAINED BY DEEP DRAWING FROM A THERMOPLASTIC SYNTHETIC SHEETING
Willi Häberle, Kalbsberg, Germany, assignor to Dahpe A.G., Lenzerheide, Switzerland
Filed Jan. 30, 1961, Ser. No. 85,647
Claims priority, application Germany Feb. 3, 1960
4 Claims. (Cl. 18—19)

There are apparatus known for manufacturing from a thermoplastic synthetic sheeting, containers such as boxes and the like serving as packages. Such apparatus generally are based on the same working principle according to which a sheeting plasticized by heating is shaped through vacuum application, or by means of a plunger.

While it is possible to manufacture with an apparatus having a plurality of tools a relatively high number of containers arranged chainlike in rows, the cutting out or the punching of the containers still remains a problem which has been avoided heretofore by having this operation effected in time wasting and cumbersome manual work.

It is a prime object of the present invention to avoid this drawback. To this end, the apparatus according to the invention has a rotatable drum having a plurality of cavities in the periphery thereof having the shape of the containers to be formed. These cavities are adapted to serve as dies for the formation of the containers. A drive means is connected to the drum which has a Geneva gear therein for intermittently driving the drum. Means are provided for feeding a synthetic thermoplastic sheeting over the surface of the drum, and vacuum means are connected to said drum for forming a vacuum at least in one cavity in one position on the drum. A deep drawing piston is provided adjacent said drum at said one position and it has a stroke only long enough such that the piston extends only part way into the cavity at the said one position. A punching tool is provided adjacent the drum at a position 180° from said deep drawing piston for punching the containers out of the sheeting after they have been drawn.

Other features and advantages of the invention will become apparent from the description now to follow, of a preferred embodiment thereof given by way of example only, and in which reference will be made to the accompanying diagrammatical drawing, in which:

FIGURE 1 is a front view of the apparatus,
FIGURE 2 is a cross-section through the suction chamber and the drive thereof at enlarged scale, and
FIGURE 3 is a section taken along the line A—B in FIGURE 2.

Referring now to the drawings reference numeral 1 designates a casing serving to receive the drive motor (not represented) and a steplessly variable gear. The casing carries a pair of lateral cantilevers 2 and 3 as well as a housing-like superstructure 4.

The lateral cantilever 2 carries on a shaft 5 a roll 6 from which the sheeting 7 is wound off in a manner to be described in more detail later on to be guided to suction drum 8 provided with cavities 8'. The drum 8 is arranged on a driving shaft 9 mounted in the superstructure 4 and driven intermittently.

This intermittent drive of the suction drum 8 is initiated according to FIGURE 2 by a Geneva wheel 10 mounted on shaft 9 and cooperating with a pin wheel 12 arranged between a pair of discs 11 and 11' and driven through a shaft 13 also lodged in the superstructure 4 and provided with a pulley 14.

The shaft 13 carries a chain wheel 15 connected over a chain 16 with a further chain wheel 17 mounted on an axle 18. The latter is provided with two cams 19 and 20 loading over rolls 21 and 22 respectively pistons 23 so that according to FIGURE 3 a pressure fluid in the cylinder 24 is displaced in accordance with the position of the cams through conduits 25 and 25' in order to operate a deep drawing piston 26 mounted in the superstructure 4 and a plunger 27 respectively.

The apparatus described above operates as follows:

Through the already mentioned intermittent drive of the suction drum 8 the sheeting 7 is drawn off the roll 6 intermittently too, and it is tensioned by a tensioning roll 28, then guided over a deviating roll 29 and hereafter around a heating roll 30 heating up the sheeting to the thermoplastic range thereof as well as also around the suction drum 8 with intermediate passage over a further deviating roll 31.

The deformation of the heated sheeting 7 is first initiated by the deep drawing pistons 26 which distort the material and press it to a certain depth into the cavities 8' forming matrixes. The further shaping of the containers to be manufactured is hereafter effected by a vacuum application for which end the drum 8 is constructed as a suction drum.

In order to prevent that the sheeting during its feed or in the further course of its stepwise advance leaves the desired position, the suction drum 8 is provided at both ends with grooves 32 and 33 (FIG. 2) engaged by endless ropes 34 (FIGURE 1) holding the sheeting 7 at both ends. The ropes 34 are guided as well in the mentioned grooves of the suction drum as also in corresponding grooves (not shown) of the heating roller 30 and of the deviating rolls 31, 35 and 36.

From the drawing it appears that the suction drum 8, owing to the heating roller 30 and to the deviating roll 31 arranged opposite thereto is enclosed in its lower zone neither by the sheeting nor by the ropes 34 serving to its guidance.

On the contrary the punched web 7' of sheeting punched by the punching tools 27 is wound onto a bobbin 37 mounted to the cantilever 3 and connected with the driving motor of the apparatus through a friction coupling. The punched out containers are ejected in direction of arrow P.

To this end it is provided that the vacuum in the suction drum starts in the range of the deep drawing pistons 26 at point A and ends in the lower range at point B. At this latter point the manufactured container which has set in the mean time is ejected by compressed air application.

I claim:

1. An apparatus for manufacturing containers by deep drawing from a synthetic thermoplastic sheet, comprising a rotatable drum having a plurality of cavities in the periphery thereof having the shape of the containers to be formed and adapted to serve as dies for the formation of the containers, a drive connected to said drum and having a Geneva gear for intermittently driving said drum, means for feeding sheeting over the surface of said drum, draw completing vacuum means connected to said drum for forming a vacuum in at least one cavity in one position of said drum, a deep draw initiating piston adjacent said drum at said one position and having a stroke only long enough such that the piston extends only part way into the cavity at said one position, said draw initiating piston initiating the deep draw and the vacuum produced by said vacuum means completing the deep draw, and at least one punching tool adjacent said drum at a position 180° from said deep drawing piston for punching out the containers from the sheeting.

2. An apparatus as claimed in claim 1 in which said means for feeding the sheeting comprise a supply bobbin on which the sheating is wound, a tensioning roll adapted to bear against the sheeting to hold it tensioned, a guide roll over which the sheeting is adapted to run, a heating roll adjacent the guide roll and the drum around which the sheeting is guided, and a further guide roll adjacent the drum at a point spaced around the drum from the heating roll for guiding the punched sheet away from the drum, said further guide roll being connected to the drive for said drum.

3. An apparatus as claimed in claim 2 in which said means for feeding the sheeting further comprise a plurality of endless ropes around said suction drum for guiding the lateral edge of the sheeting, said suction drum having grooves around the edges thereof in which said ropes are guided, said guide rolls and heating roll also having grooves therearound, and said ropes also extending around said guide rolls and heating roll.

4. An apparatus as claimed in claim 1 in which said deep drawing piston and said punching tool each have hydraulic operating means, and cam actuating means driven by said drive means for said drum and acting on said hydraulic operating means for operating said deep drawing piston and said punching tool in synchronism with the rotation of said drum.

References Cited in the file of this patent

UNITED STATES PATENTS

| | | |
|---|---|---|
| 2,183,869 | Randall et al. | Dec. 19, 1939 |
| 2,480,960 | Press | Sept. 6, 1949 |
| 2,590,379 | Cloud | Mar. 25, 1952 |
| 2,609,568 | Getchell | Sept. 9, 1952 |
| 2,683,894 | Kritchever | July 20, 1954 |
| 2,779,135 | Eisler | Jan. 29, 1957 |
| 2,902,718 | Martelli et al. | Sept. 8, 1959 |
| 2,905,969 | Gilbert et al. | Sept. 29, 1959 |
| 3,027,596 | Knowles | Apr. 3, 1962 |

FOREIGN PATENTS

| | | |
|---|---|---|
| 857,973 | Great Britain | Jan. 4, 1961 |

OTHER REFERENCES

"New Automatic Vacuum Forming Machine for the Packaging Industry," Rubber and Plastics Age, July 1957, p. 623.